Figure 1:
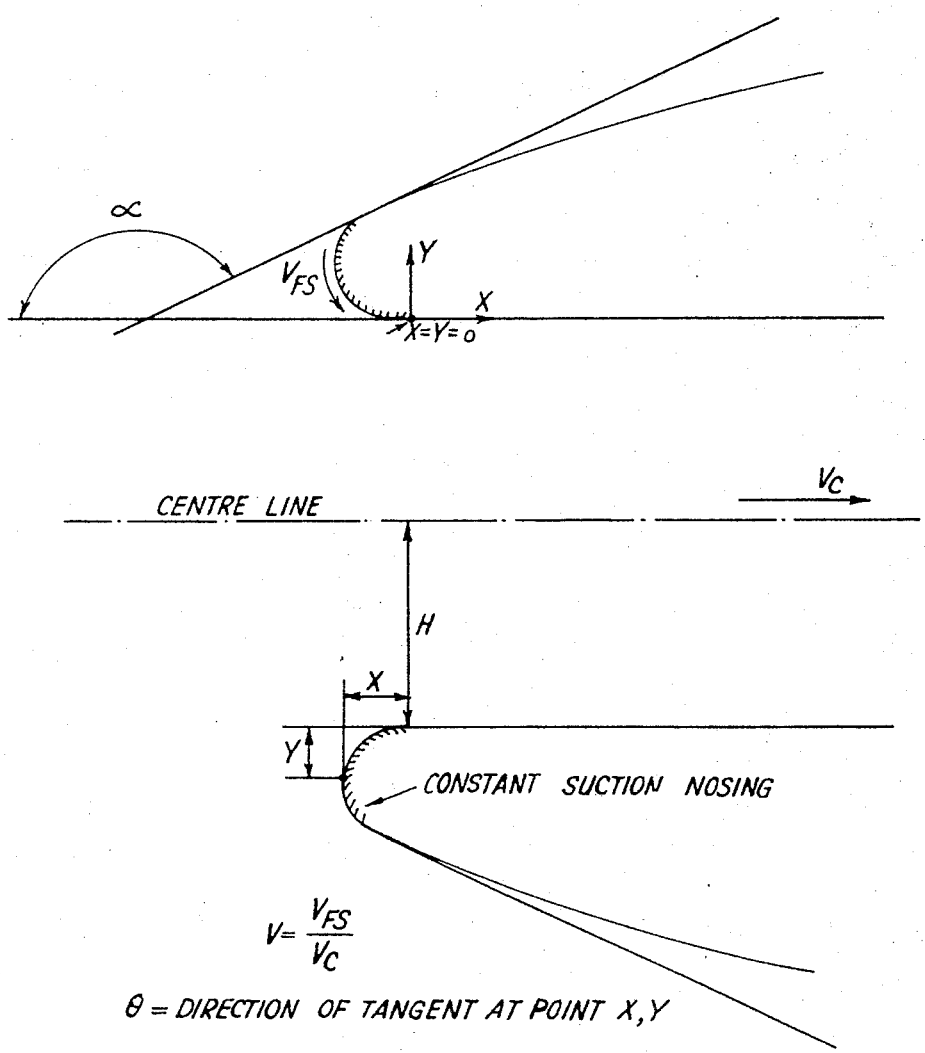

SCHEMATIC OF TWO-DIMENSIONAL DUCT WITH CONSTANT SUCTION NOSING

RECTANGULAR INTAKE

TRIANGULAR INTAKE

AXI-SYMMETRIC INTAKE OF
CIRCULAR CROSS-SECTION $\alpha = 156°$  $V = 2.0$

United States Patent Office 3,444,872
Patented May 20, 1969

3,444,872
FLUID FLOW ENTRIES
Ellis Joseph Gabbay, 384 Cedar Ave.,
Ridgewood, N.J. 07450
Filed Feb. 19, 1964, Ser. No. 345,973
Claims priority, application Great Britain, Feb. 20, 1963,
6,914/63
Int. Cl. F02k *11/00;* F02b *27/00;* F02m *35/10*
U.S. Cl. 137—15.1                                  3 Claims The invention relates, in a general manner, to streamlining fluid flow entries of any sectional contour. Some important specific applications include: (1) air intakes for lift or propulsion engines in aircraft; (2) entries for ducted fans, including Hovercraft fan entries; (3) wind tunnel bellmouths; (4) pipeline fluid entries and collector tubes from fluid containers; (5) auxiliary entries as for flow/thrust inducers, or jet flaps; (6) induction slots for wing boundary layer control; (7) carburetor air induction tube entries.

In these and many other applications, the object of teh invention is to induce a fluid stream into a duct from a low velocity or static approach region in such manner as to incur the least loss of total head at some downstream section where either the flow has become a sensibly uniform stream or is about to enter a processing device, i.e. an engine compressor or fan rotor plane.

According to the present invention, high intake efficiency is achieved by shaping the entry nosing or cowl in such a manner as to induce substantially constant suction, and hence constant fluid velocity, over its entire inflow contour. The aim is to prevent separation of the rapidly turning stream, which often happens when a nosing or cowl shape induces peaky instead of uniform suction along its inflow perimeter.

Intake efficiency here is defined as the ratio:

$$\frac{\text{Available total fluid pressure head downstream of the entry}}{\text{Initial total fluid pressure head}} \times 100$$

This inventive concept of constant suction flow bounding contours is an extension of a physical principle according to which a fluid jet contracts to a uniform stream under the constraint of constant pressure on its free boundaries. The advance provided herein is the technique of shaping the boundaries so as to induce a relatively greater or lesser magnitude of constant suction than is attainable with a freely formed jet.

The technique of the invention and how it may be adopted in practice will now be described in detail with reference to the accompanying drawings which are diagrams of various flow entries.

The entry profiles are derived from a special Hodograph transformation of the flow field for a generalised family of sharp-edged two-dimensional entries. In such entries, the flow separates at the edges and becomes bounded by free streamlines of constant pressure. These converge to a minimum section, the "Vena-Contracta" where the velocity throughout the section is uniform and of maximum value as on the free streamlines. Thus if:

$V_\text{C}$=uniform flow velocity in the "vena-contracta" plane,
$V_\text{FS}$=constant velocity along a free streamline, and
$V=V_\text{FS}/V_\text{C}$ then ordinarily for a jet, $V_\text{C}=V_\text{FS}$ or $V=1$.

By direct comparison, the technique according to the invention provides a new family of free-streamlining or boundary shapes for which any value of $V=V_\text{FS}/V_\text{C}$ can be pre-assigned.

Attention is now directed to FIGURE 1, which shows in side elevation a theoretical two-dimensional duct entry with constant suction nosing. The boundary shapes are determined from the following equations:

$$\frac{X}{H} = \frac{2}{\pi V}\left(\frac{A\alpha}{\pi} \sin\theta + B \cos\theta - C\right) \quad (1)$$

$$\frac{Y}{H} = \frac{2}{\pi V}\left(\frac{A\alpha}{\pi} \cos\theta - B \sin\theta\right) \quad (2)$$

Where:

X, Y=rectangular coordinates for a constant suction nose shape (see FIGURE 1);
H=the half width of the duct interior in the plane $X=0$ of the nose shape (see FIGURE 1);
$\alpha$=exterior complement of the cowl wedge angle (see FIGURE 1);
$\theta$=the angle of the tangent at each point X, Y;
V=ratio of boundary velocity to mean downstream velocity
 $=V_\text{FS}/V_\text{C}$ as previously defined;

$$A = \sum_{j=1}^{j=\infty} \frac{V^{-j\frac{\pi}{\alpha}}}{j^2 - \left(\frac{\alpha}{\pi}\right)^2} \sin\frac{j\pi}{\alpha}\theta$$

$$B = \sum_{j=1}^{j=\infty} \frac{jV^{-j\frac{\pi}{\alpha}}}{j^2 - \left(\frac{\alpha}{\pi}\right)^2} \cos\frac{j\pi}{\alpha}\theta$$

$$C = \sum_{j=1}^{j=\infty} \frac{jV^{-j\frac{\pi}{\alpha}}}{j^2 - \left(\frac{\alpha}{\pi}\right)^2}$$

where $j$ is the enumerating and variable integer=1, 2, 3 etc.

The above equations are theoretically for two-dimensional entries, that is to say slot-type entries having a uniform finite width of duct opening (H) in one direction at right angles to the duct axis, the length of the duct cross section in the other direction at right angles to that of the dimension (H) being assumed to be infinite. These equations can, however, be used in the above form for duct cross-sectional openings of finite length as will hereinafter be explained.

According to an important aspect of the invention, for a three-dimensional entry the above equations are used by putting $H=R/2$, where R is the principal radius of curvature of the entry cross section at such point thereon as is under consideration. In this way, the technique is extended for application to duct cross-sections of any irregular or arbitrary configuration.

DESIGN PROCEDURES FOR AIRCRAFT AIR INTAKES

"Two-dimensional" intakes

Figure 2:
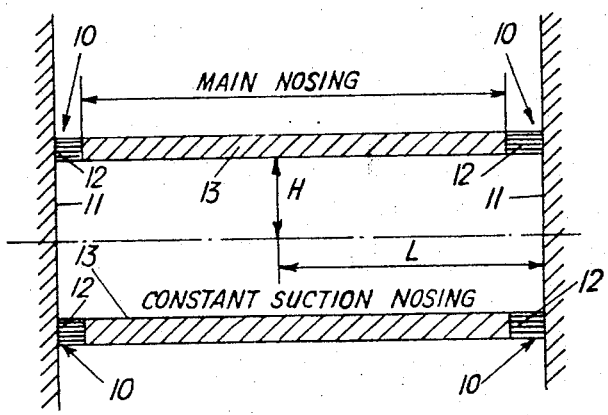
Figure 3:
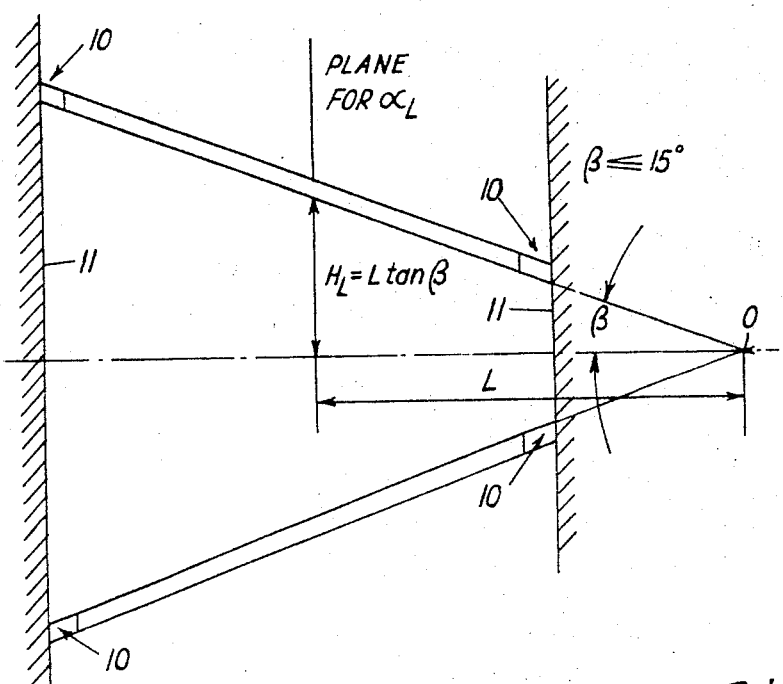

FIGURES 2 and 3 show, in front elevation, examples of rectangular and triangular intakes which may be treated directly by the two-dimensional Equations 1 and 2. In these cases, given the local or constant magnitudes of H and $\alpha$, the coordinates (X, Y) of the local or constant profile can be calculated to scale from Equations 1 and 2 by a suitable choice of V. For the smallest nosing at design mass flow, V should be assigned the highest value compatible with the requirement that the local mach number at the boundary is not greater than 1.2.

If the nose profile so calculated appears too thick from the aspect of drag penalty in forward flight, the X, Y coordinates may be scaled down by as much as 10% off design without appreciable reduction in the static intake efficiency.

With side walls 11 as in FIGURES 2 and 3, interference effects at the corners can be suppressed by slotting the main leading edge or nosing as at 10 and providing short local segments 12 of secondary leading edge somewhat aft of the main leading edge 13.

In FIGURE 3, the value H is not constant across the duct section but becomes the variable $H_L$ dependent on the distance L from the point of origin O of the diverging cross-sectional configuration. In this case the profile may be determined by working out the coordinates at suitably spaced reference points across the section and deriving the intermediate shape by fairing lines through these points.

AXI-SYMMETRICAL AND THREE-DIMENSIONAL INTAKES

Figure 4:
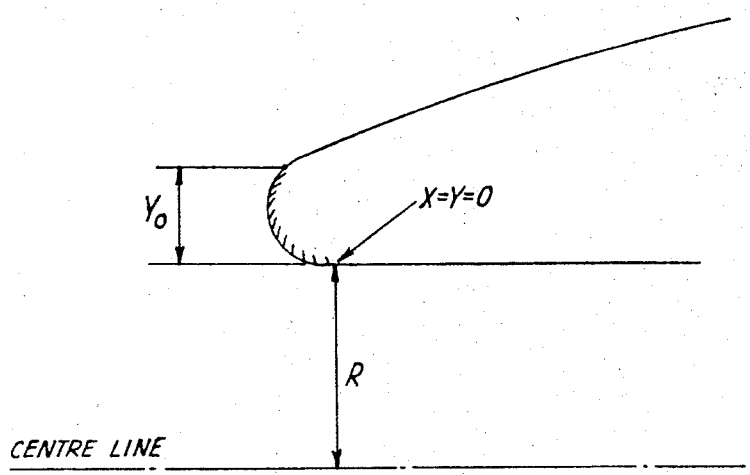
Figure 4:
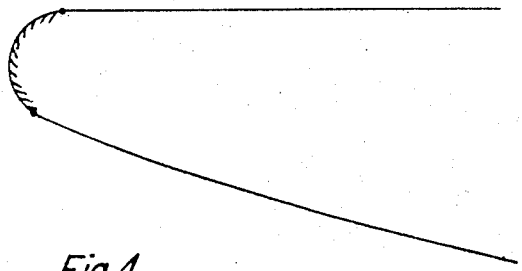

The simplest case of a three-dimensional intake is a circular cross-section intake as in FIGURE 4, having an interior duct radius R at $X=Y=0$. Provided $R/Y_0 > 5$, where $Y_0$ is the thickness of the nosing at the leading edge of the intake, then Equations 1 and 2 may be applied directly to determine the (X, Y) coordinates of the nose profile by using the correlation $H=R/2$.

This procedure may also be used for a semi-circular intake bounded by a plane side wall; in this case however the corners should be slotted back as already described for other intakes having plane wall terminations.

The general procedure for "D" type intakes, or other intakes of arbitrary configuration in cross-section, is as follows. The principal radius of curvature at each of a selected number of reference points is determined; then using the correlation $H=R/2$, local contours are calculated from Equations 1 and 2. The intermediate shaping can then be determined by fairing lines.

Using the technique of this invention, the boundary suction can be appropriately matched to the inflow requirements so that high efficiency is obtained throughout the desired mass flow range, in a manner which combines the following important advantages:

(1) Smallest nosing or cowl dimensions to achieve the required flow rate or flow convergence.

(2) Minimum duct blockage, both on account of reduced cowl dimensions and because the constancy of suction over the entry profile inhibits boundary layer growth and premature separation.

(3) As adjacent streamlines closely follow the inflow contour of the nosing, whilst the velocity along interior streamlines is of lower magnitude than that on the bounding profile, it follows that the flow is insensitive to compressibility effects. Therefore, a high intake efficiency is maintained throughout the range of duct inflows up to the choke limit.

Figure 5:
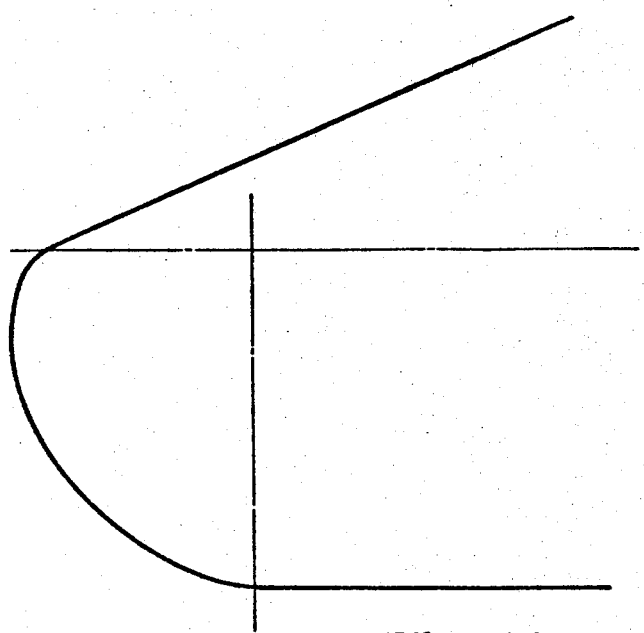

FIGURE 5 of the drawings is an example of a duct inlet profile actually computed according to the technique of this invention. The following table gives the computer tabulations of the coordinate values in terms of $XV/H$ and $YV/H$. To obtain the coordinate ratios it is necessary to divide by the value of V. In this example $V=2.0$ and $a=156°$.

| XV/H 0 | YV/H 0 |
|---|---|
| −0.156551E−02 | 0.521715E−04 |
| −0.619950E−02 | [1] 0.413008E−03 |
| −0.137212E−01 | 0.137004E−02 |
| −0.238491E−01 | 0.317163E−02 |
| −0.362270E−01 | 0.601424E−02 |
| −0.504525E−01 | 0.100362E−01 |
| −0.661066E−01 | 0.153177E−01 |
| −0.827769E−01 | 0.218851E−01 |
| −0.100076E−00 | 0.297187E−01 |
| −0.117655E−00 | 0.387618E−01 |
| −0.135207E−00 | 0.489304E−01 |
| −0.152474E−00 | 0.601209E−01 |
| −0.169240E−00 | 0.722179E−01 |
| −0.185335E−00 | 0.850999E−01 |
| −0.200624E−00 | 0.986437E−01 |
| −0.215006E−00 | 0.112728E−00 |
| −0.228410E−00 | 0.127235E−00 |
| −0.240788E−00 | 0.142054E−00 |
| −0.252113E−00 | 0.157079E−00 |
| −0.262376E−00 | 0.172211E−00 |
| −0.271579E−00 | 0.187360E−00 |
| −0.279739E−00 | 0.202443E−00 |
| −0.286882E−00 | 0.217382E−00 |
| −0.293038E−00 | 0.232109E−00 |
| −0.298247E−00 | 0.246561E−00 |
| −0.302552E−00 | 0.260680E−00 |
| −0.306001E−00 | 0.274418E−00 |
| −0.308644E−00 | 0.287728E−00 |
| −0.310532E−00 | 0.300572E−00 |
| −0.311721E−00 | 0.312916E−00 |
| −0.312264E−00 | 0.324731E−00 |
| −0.312219E−00 | 0.335993E−00 |
| −0.311642E−00 | 0.346681E−00 |
| −0.310588E−00 | 0.356780E−00 |
| −0.309114E−00 | 0.366279E−00 |
| −0.307275E−00 | 0.375169E−00 |
| −0.305126E−00 | 0.383447E−00 |
| −0.302722E−00 | 0.391113E−00 |
| −0.300115E−00 | 0.398170E−00 |
| −0.297357E−00 | 0.404623E−00 |
| −0.294498E−00 | 0.410483E−00 |
| −0.291588E−00 | 0.415761E−00 |
| −0.288673E−00 | 0.420474E−00 |
| −0.285801E−00 | 0.424638E−00 |
| −0.283014E−00 | 0.428276E−00 |
| −0.280354E−00 | 0.431410E−00 |
| −0.277863E−00 | 0.434065E−00 |
| −0.275576E−00 | 0.436269E−00 |
| −0.273531E−00 | 0.438053E−00 |
| −0.271760E−00 | 0.439449E−00 |
| −0.270296E−00 | 0.440489E−00 |
| −0.269165E−00 | 0.441211E−00 |
| −0.268396E−00 | 0.441650E−00 |
| −0.268010E−00 | 0.441846E−00 |
| −0.267968E−00 | 0.441866E−00 |

[1] Decimal factor, i.e., 0.413008E−03=0.0004130000.

I claim:

1. A fluid flow entry comprising a duct having a wedge shaped exterior cowl merging with a leading edge having local contours determined by the rectangular coordinates X, Y according to the equations:

$$\frac{X}{H} = \frac{2}{\pi V}\left(\frac{A\alpha}{\pi}\sin\theta + B\cos\theta - C\right)$$

$$\frac{Y}{H} = \frac{2}{\pi V}\left(\frac{A\alpha}{\pi}\cos\theta - B\sin\theta\right)$$

where:

H = the half width of the duct interior in the plane $X=0$ of the nose shape;

$\alpha$ = exterior complement of the cowl wedge angle;
$\theta$ = the angle of the tangent at each point X, Y;
V = the highest value compatible with the requirement that the requirement that the local mach at the boundary is not greater than 1.2;

$$A = \sum_{j=1}^{j=\infty} \frac{V^{-j\frac{\pi}{\alpha}}}{j^2 - \left(\frac{a}{\pi}\right)^2} \sin \frac{j\pi}{a} \theta$$

$$B = \sum_{j=1}^{j=\infty} \frac{jV^{-j\frac{\pi}{\alpha}}}{j^2 - \left(\frac{a}{\pi}\right)^2} \cos \frac{j\pi}{a} \theta$$

$$C = \sum_{j=1}^{j=\infty} \frac{jV^{-j\frac{\pi}{\alpha}}}{j^2 - \left(\frac{a}{\pi}\right)^2}$$

$j$ being the enumerating and variable integer = 1, 2, 3, etc. and then deriving the shape intermediate said local contours by means of fairing lines.

2. A three-dimensional entry according to claim 1, wherein H is equal to $R/2$, R being the principal radius of curvature of the entry cross-section at each point under consideration.

3. An entry according to claim 1, having an opening or cross-section with a sharp-cornered periphery, and wherein the main leading edge or nosing of the entry is slotted back at the corners.

No references cited.

ALAN COHAN, *Primary Examiner.*